United States Patent
Shin et al.

(10) Patent No.: US 10,906,217 B2
(45) Date of Patent: Feb. 2, 2021

(54) MOLDING FOR HIGH BRIGHTNESS APPEARANCE AND MOLDING METHOD THEREOF

(71) Applicant: LG Electronics Inc., Seoul (KR)

(72) Inventors: Jiwon Shin, Seoul (KR); Kyungdo Kim, Seoul (KR); Seokjae Jeong, Seoul (KR); Younghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 146 days.

(21) Appl. No.: 16/077,245

(22) PCT Filed: Jan. 19, 2017

(86) PCT No.: PCT/KR2017/000657
§ 371 (c)(1),
(2) Date: Aug. 10, 2018

(87) PCT Pub. No.: WO2017/138706
PCT Pub. Date: Aug. 17, 2017

(65) Prior Publication Data
US 2019/0047190 A1    Feb. 14, 2019

(30) Foreign Application Priority Data

Feb. 12, 2016  (KR) .................. 10-2016-0016528

(51) Int. Cl.
*B29C 45/14*       (2006.01)
*B05D 5/06*        (2006.01)
(Continued)

(52) U.S. Cl.
CPC ................ *B29C 45/14* (2013.01); *B05D 5/06* (2013.01); *B05D 7/14* (2013.01); *B05D 7/24* (2013.01);
(Continued)

(58) Field of Classification Search
CPC .. B29C 45/14; B05D 5/06; B05D 7/14; B05D 7/24; B32B 15/08; B32B 18/00; B32B 27/18
(Continued)

(56) References Cited

U.S. PATENT DOCUMENTS

| 4,978,394 A   * | 12/1990 | Ostertag  ................... A61Q 1/02 |
|                 |         |                              106/404   |
| 6,783,584 B2 * | 8/2004  | Takahashi ................ A61K 8/19   |
|                 |         |                              106/403   |
| 2006/0251864 A1* | 11/2006 | Bordener .................. B32B 5/16  |
|                 |         |                              428/172   |

FOREIGN PATENT DOCUMENTS

| JP | H09183136 A | 7/1997 |
| JP | 2001314813  | 11/2001 |

(Continued)

OTHER PUBLICATIONS

JP-2002146054-A, machine translation, EPO espacenet. (Year: 2002).*

(Continued)

*Primary Examiner* — Josephine L Chang
(74) *Attorney, Agent, or Firm* — Fish & Richardson P.C.

(57) ABSTRACT

Disclosed is a molded article including a base layer, a surface layer having a resin and formed to cover at least a portion of the base layer, and a reflective material mixed with the resin and reflecting light, wherein the reflective material includes a metal flake, and a metal oxide layer stacked on the metal flake.

10 Claims, 2 Drawing Sheets

(51) Int. Cl.
    *B05D 7/14*           (2006.01)
    *B05D 7/24*           (2006.01)
    *B32B 15/08*          (2006.01)
    *B32B 27/18*          (2006.01)
    *B32B 18/00*          (2006.01)

(52) U.S. Cl.
    CPC .............. *B32B 15/08* (2013.01); *B32B 18/00* (2013.01); *B32B 27/18* (2013.01)

(58) Field of Classification Search
    USPC ........................................................ 524/441
    See application file for complete search history.

(56) References Cited

FOREIGN PATENT DOCUMENTS

| | | | |
|---|---|---|---|
| JP | 2002146054 A | * | 5/2002 |
| JP | 2005014249 | | 1/2005 |
| JP | 2006159608 | | 6/2006 |
| JP | 2010167649 | | 8/2010 |

OTHER PUBLICATIONS

"Toyal America Non Leafing TCR and TSB Series," Toyal America Inc. [retrieved Jun. 22, 2020]. Retrieved from the Internet: < http://www.toyala.com/cgi-bin/r.cgi/nlp_tcrtsb.html?OWNER= biphoq81w>. (Year: 2020).*

* cited by examiner

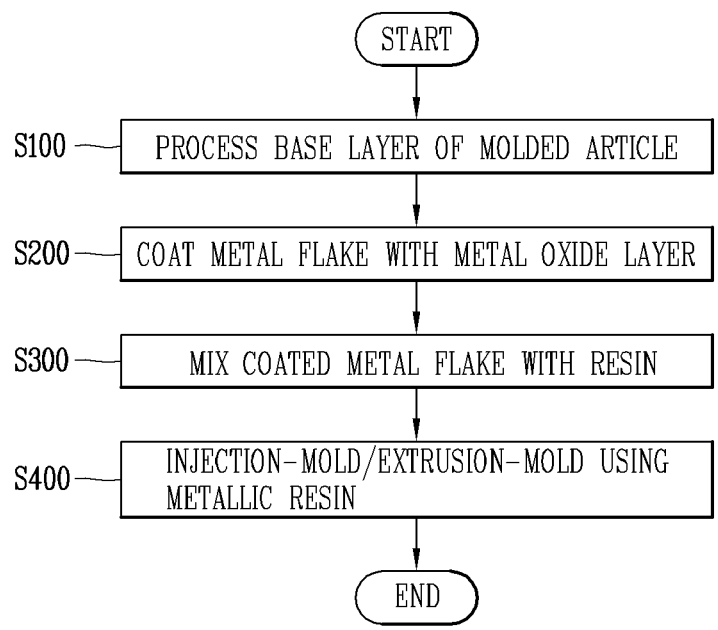

MOLDING FOR HIGH BRIGHTNESS APPEARANCE AND MOLDING METHOD THEREOF

CROSS-REFERENCE TO RELATED APPLICATIONS

This application is a National Stage application under 35 U.S.C. § 371 of International Application No. PCT/KR2017/000657, filed on Jan. 19, 2017, which claims the benefit of Korean Application No. 10-2016-0016528, filed on Feb. 12, 2016. The disclosures of the prior applications are incorporated by reference in their entirety.

BACKGROUND OF THE INVENTION

1. Field of the Invention

The present disclosure relates to a molded article for providing high brightness to an appearance and a molding method of the molded article.

2. Description of the Related Art

In order to realize a fine appearance of a molded article, a method of spraying a spray liquid including particles of silver powder, or the like, having high brightness to a general molded article molded with a general resin is used. However, the post-processing method using the spray liquid increases manufacturing cost due to a difficulty in masking, a defect, handling, and the like, and is harmful to human bodies due to the use of volatile organic compounds. Thus, recently, in order to eliminate the surface treatment process using a spray liquid, a so-called metallic mold method of directly adding a metal flake to a resin has been used.

In the related art metallic mold method, a single layer of a metal flake is added to a resin to form a molded article. In this method, uneven roughness of a surface of the metal flake reduces a reflection area of light formed on an outer appearance of the molded article, limiting improvement of brightness of the molded article.

In addition, in the related art, brightness of an appearance of a molded article is improved by adjusting a size of metal flake used in the metallic mold method and a mixture ratio of the metal flake and a resin. However, the method of improving an appearance brightness of a molded article has some problems. First, in case where the content of the metal flake is increased so as to increase brightness of the appearance of the molded article, brightness of the molded article may be improved, but the physical properties of the resin mixed with the metal flake are lowered, degrading moldability of the resin and resultantly making it difficult to obtain a required surface quality of a molded article.

SUMMARY OF THE INVENTION

An aspect of the present disclosure provides a molded article having an appearance with high brightness using a resin mixed with a metal flake, and a method of molding a molded article.

Another aspect of the present disclosure provides a molded article including a reflective material having a new structure to improve surface roughness of a metal flake to thus have an appearance with high brightness, and a method of molding a molded article.

According to an aspect of the present disclosure, there is provided a molded article including: a base layer; a surface layer having a resin and formed to cover at least a portion of the base layer; and a reflective material mixed with the resin and reflecting light, wherein the reflective material includes a metal flake; and a metal oxide layer stacked on the metal flake.

The surface layer may be formed by double injection molding or double extrusion molding.

The metal oxide layer may include: a first oxide layer formed to cover the metal flake; and a second oxide layer formed to cover the first oxide layer and formed of a type of metal oxide different from that of the first oxide layer.

The reflective material may be formed of a metal and further include a metal layer formed to cover the metal oxide layer.

The base layer may have transmittance lower than that of the surface layer.

The reflective material may have a plate shape in which a diameter is greater than a thickness.

The thickness of the surface layer may be set to be smaller than a diameter of the reflective material so that a plane forming the diameter of the reflective material is exposed to the outside of the surface layer.

The thickness of the surface layer may be in a ratio of 10% to 70% to a total thickness of the molded article.

The metal oxide layer may include a metal oxide selected from the group consisting of $SiO_2$, $TiO_2$, $Fe_2O_3$, $SnO_2$, and $MgF_2$.

Transmittance of the resin may be 85% to 100%.

A haze of the resin may be 0% to 3%.

The metal flake may be a metal including selected from the group consisting of aluminum, silver, gold, platinum, palladium, copper, and bronze, or an alloy thereof.

According to another aspect of the present disclosure, there is provided a method of molding a molded article including: processing a base layer of a molded article; stacking a metal oxide layer on a metal flake to create a reflective material reflecting light; mixing the reflective material with a resin to form a metallic resin; and covering at least a portion of the base layer with the metallic resin to provide properties of reflecting light to an appearance of the base layer.

According to the present disclosure, the surface layer is formed to cover at least a portion of the base layer constituting one region of the molded article, and the reflective material mixed with the resin constituting the surface layer includes a metal flake and a metal oxide layer stacked on the metal flake. Accordingly, since properties of reflecting light is provided to the remaining area of the molded article except for the base layer, an arrangement of the reflective material is uniform to improve brightness of an appearance of the molded article, and since a required amount of the reflective material is reduced, manufacturing cost of the molded article may be reduced.

In addition, in the present disclosure, the first and second oxide layers are sequentially stacked on the metal flake or the metal layer formed to cover the metal oxide layer stacked on the metal flake is provided. Accordingly, surface roughness of the metal flake may be improved to enhance reflectivity of the reflective material, oxidation and breaking of the metal flake may be prevented, and a color of the appearance of the molded article may be variously implemented according to types of a material forming the metal oxide or the metal layer.

BRIEF DESCRIPTION OF THE DRAWINGS

FIG. 3 is a flowchart illustrating a method of molding the molded article illustrated in FIG. 1.

DETAILED DESCRIPTION OF THE INVENTION

Hereinafter, a molded article and a method of molding a molded article according to the present disclosure will be described in detail with reference to the accompanying drawings.

As used herein, the singular forms "a", "an" and "the" are intended to include the plural forms as well, unless the context clearly indicates otherwise.

Like numbers refer to like elements throughout although the embodiments are different, and a redundant description thereof will be omitted.

In describing the present invention, if a detailed explanation for a related known function or construction is considered to unnecessarily divert the gist of the present invention, such explanation has been omitted but would be understood by those skilled in the art.

The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

Figure 1:
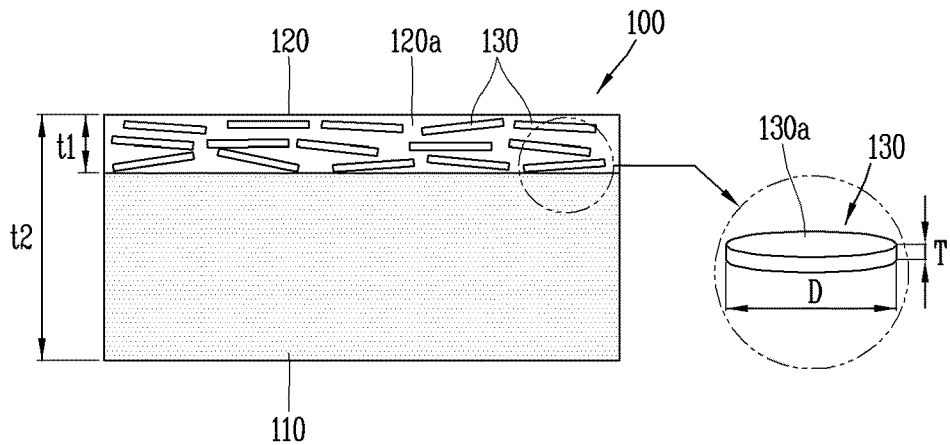
FIG. 1 is a conceptual view illustrating a molded article for realizing a high brightness appearance according to an embodiment of the present disclosure.
Figure 2A:
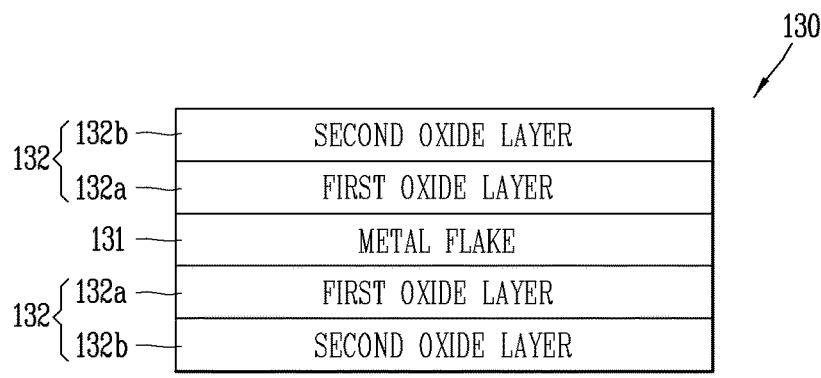
FIG. 2A is a conceptual view illustrating a first example of a reflective material illustrated in FIG. 1.
Figure 2B:
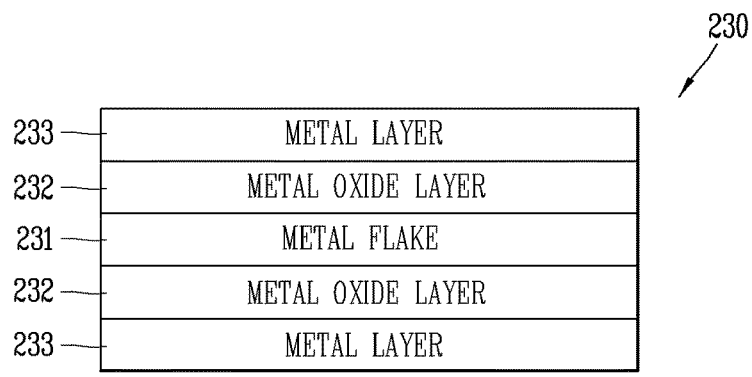
FIG. 2B is a conceptual view illustrating a second example of the reflective material illustrated in FIG. 1.

FIG. 1 is a conceptual view illustrating a molded article 100 for implementing an appearance with high brightness according to an embodiment of the present disclosure, FIG. 2A is a conceptual view illustrating a first example of a reflective material 130 illustrated in FIG. 1, and FIG. 2B is a conceptual view illustrating a second example of the reflective material 130 illustrated in FIG. 1.

Referring to FIGS. 1 to 2B, a molded article 100 includes a base layer 110, a surface layer 120, and a reflective material 130.

The base layer 110 is formed so as to constitute any one region of the molded article 100.

The surface layer 120 includes a resin 120a and is formed to cover at least a portion of the base layer 110. In FIG. 1, it is illustrated that the surface layer 120 covers the entirety of the base layer 110, but the surface layer 120 may be configured to cover only a portion the base layer 110 and the remaining portions of the base layer 110 may not be covered by the surface layer 120. In addition, transmittance of the resin 120a may be 85% to 100%. In addition, the surface layer 120 may be formed as a thin film having a thickness t1. For example, the thickness t1 may be in a ratio of 10% to 70% of a total thickness t2 of the molded article 100. A haze of the resin 120a, that is, a degree of cloudiness of the resin 120a, may be 0% to 3%. For reference, when the haze of the resin 120a is reduced, transparency of the resin 120a increases.

The surface layer 120 may be formed to cover at least a portion of the base layer 110 by double injection molding or double extrusion molding. That is, the molded article 100 according to the present disclosure may not be entirely formed by injection molding or extrusion molding but a portion of the molded article 100, particularly, a portion forming an appearance of the molded article 100, may be formed by injection molding or extrusion molding. Here, the base layer 110, as well as the surface layer 120, may also be formed by injection molding or extrusion molding.

The reflective material 130 is mixed with the resin 120a forming the surface layer 120 to reflect light. Specifically, the reflective material 130 includes a metal flake 131 and a metal oxide layer 132.

The metal flake 131 may be formed of a material having relatively storing properties of reflecting incident light, for example, a metal including one selected from the group consisting of aluminum, silver, gold, platinum, palladium, copper, and bronze, or an alloy including the metal.

The metal oxide layer 132 is stacked on the metal flake 131 and is formed of a metal oxide. For example, the metal oxide layer 132 may include one selected from the group consisting of $SiO_2$ (silicon dioxide), $TiO_2$ (titanium dioxide), $Fe_2O_3$ (ferric trioxide), $SnO_2$ (tin dioxide), and $MgF_2$ (magnesium fluoride).

Meanwhile, the base layer 110 may be formed to have transmittance lower than that of the surface layer 120. That is, the base layer 110 and the surface layer 120 exhibit different transmittance. In the base layer 110, specific structures provided in the molded article 100, for example, a fastening structure, a rib structure, a hole structure, and the like, may be formed. In the molded article 100 of the present disclosure, the base layer 110 has transmittance lower than that of the surface layer 120 to provide high brightness to the appearance of the molded article 100 through the surface layer 120, and exposure of the fastening structure, the rib structure, the hole structure, and the like, to the outside of the molded article 100 is minimized to enhance quality of the appearance of the molded article.

The reflective material 130 mixed with the resin 120a may have a plate shape in which a diameter D is greater than a thickness T, for example, a shape similar to a circular or oval coin.

In order to allow a plane 130a forming the diameter D of the reflective material 130 to be exposed to the outside of the surface layer 120, the thickness t1 of the surface layer 120 may be set to be smaller than the diameter D of the reflective material 130. According to this structure, as illustrated in FIG. 1, since the diameter D of the reflective material 130 is greater than the thickness t1 of the surface layer 120, a probability in which the planes 130a forming the diameter D of the reflective materials 130 are arranged toward the appearance of the surface layer 120 is increased. As a result, an area reflecting light incident to the surface layer 120 is significantly increased to provide high brightness to the appearance of the molded article 100. Here, the diameter D of the reflective material 130 may refer to an average diameter D of the plurality of reflective materials 130.

According to the present disclosure described above, since the surface layer 120 is formed to cover at least a portion of the base layer 110 constituting any one region of the molded article 100, and the reflective material 130 mixed in the resin 120a constituting the surface layer 120 includes the metal flake 131 and the metal oxide layer 132 stacked on the metal flake 131. Thus, since properties of reflecting light is given to the remaining region, i.e., the surface layer 120, of the molded article 100 other than the base layer 110 by so-called double injection molding or double extrusion molding, density of the reflective material 130 included in the surface layer 120 is increased, an arrangement of the reflective materials 130 is uniform to improve brightness of the appearance of the molded article 100, and a required amount of the reflective material 130 is reduced to reduce manufacturing cost of the molded product 100.

Referring to FIG. 2A, the metal oxide layer 132 stacked on the metal flake 131 may include a first oxide layer 132a and a second oxide layer 132b.

The first oxide layer 132a is formed to cover the metal flake 131 serving as a base of the reflective material 130.

The second oxide layer 132b is formed to cover the first oxide layer 132a covering the metal flake 131 and is formed of a type of metal oxide different from that of the first oxide layer 132a.

Referring to FIG. 2B, the reflective material 230 may further include a metal layer 233.

Specifically, the reflective material 230 includes a metal oxide layer 232 formed to cover the metal flake 231 serving as a base and a metal layer 233 formed of a metal and covering the metal oxide layer 232.

According to the structure of the reflective materials 130 and 230 illustrated in FIGS. 2A and 2B, in the present disclosure, since the first and second oxide layers 132a and 132b are sequentially stacked on the metal flake 131 or the metal layer 233 is formed to cover the metal oxide layer 232 stacked on the metal flake 231, surface roughness of the metal flakes 131 and 231 may be improved to enhance reflectivity of the reflective materials 130 and 230 and prevent oxidation and breaking of the metal flakes 131 and 231, and due to unique properties of the materials respectively forming the metal oxides 132 and 232 or the metal layer 233 related to light, various colors of the appearance of the molded article 100 may be implemented according to types of the metal oxides 132 and 232 or the metal layer 233.

Hereinafter, a method of molding a molded article 100 for realizing an appearance with high brightness according to another embodiment of the present disclosure will be described with reference to FIGS. 1 and 3.

FIG. 1 is a conceptual view illustrating a molded article 100 for realizing a high brightness appearance according to an embodiment of the present disclosure, and FIG. 3 is a flowchart illustrating a method of molding the molded article 100 illustrated in FIG. 1. In addition, some of the components included in the method of molding the molded article 100 to be described later may have characteristics similar to those included in the molded article 100 described above with reference to FIGS. 1 to 2B.

Referring to FIG. 3, a method of molding the molded article 100 includes a step (S100) of processing the base layer 110 forming one region of the molded article 100. The base layer 110 may be formed by injection molding or extrusion molding.

Next, the molding method includes a step (S200) of stacking the metal oxide layer 132 on the metal flake 131 to form the reflective material 130 which reflects light.

Next, the molding method includes a step (S300) of mixing the reflective material 130 with the resin 120a to form a metallic resin including a mixture of the resin 120a and the reflective material 130.

Finally, the method of molding the molded article 100 includes a step (S400) of molding such that at least a portion of the base layer 110 is covered with the metallic resin to provide properties of reflecting light to an appearance of the base layer 110. The step (S400) of molding such that at least a portion of the base layer 110 is covered with the metallic resin may be performed using a method of double injection molding or double extrusion molding on the base layer 110.

What is claimed is:

1. A molded article comprising:
a base layer;
a surface layer that includes a resin and that covers at least a portion of the base layer; and
a reflective material mixed with the resin and configured to reflect light, the reflective material having a plate shape that has a diameter greater than a thickness,
wherein the reflective material includes:
a metal flake, and
a metal oxide layer stacked on the metal flake,
wherein a thickness of the surface layer is less than the diameter of the reflective material, and
wherein the base layer has a transmittance lower than a transmittance of the surface layer.

2. The molded article of claim 1, wherein the surface layer is formed by double injection molding or double extrusion molding.

3. The molded article of claim 1, wherein transmittance of the resin is 85% to 100%.

4. The molded article of claim 1, wherein a haze of the resin is 0% to 3%.

5. The molded article of claim 1, wherein the reflective material defines a circular surface that is oriented toward an outer surface of the molded article and that is configured to reflect light.

6. The molded article of claim 1, wherein the metal flake is a metal selected from the group consisting of aluminum, silver, gold, platinum, palladium, copper, and bronze, or an alloy thereof.

7. The molded article of claim 1, wherein the metal oxide layer includes a metal oxide selected from the group consisting of $SiO_2$, $TiO_2$, $Fe_2O_3$, $SnO_2$, and $MgF_2$.

8. The molded article of claim 1, wherein the metal oxide layer includes:
a first oxide layer formed to cover the metal flake; and
a second oxide layer formed to cover the first oxide layer and formed of a type of metal oxide different from that of the first oxide layer.

9. The molded article of claim 1, wherein the reflective material further includes a metal layer that covers the metal oxide layer.

10. A molded article comprising:
a base layer;
a surface layer that includes a resin and that covers at least a portion of the base layer; and
a reflective material mixed with the resin and configured to reflect light, the reflective material having a plate shape that has a diameter greater than a thickness,
wherein the reflective material includes:
a metal flake, and
a metal oxide layer stacked on the metal flake,
wherein a thickness of the surface layer is less than the diameter of the reflective material, and
wherein the thickness of the surface layer is in a ratio of 10% to 70% to a total thickness of the molded article.

* * * * *